US008079523B2

(12) United States Patent
Barkan

(10) Patent No.: US 8,079,523 B2
(45) Date of Patent: Dec. 20, 2011

(54) IMAGING OF NON-BARCODED DOCUMENTS

(75) Inventor: Edward D. Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 446 days.

(21) Appl. No.: 12/334,830

(22) Filed: Dec. 15, 2008

(65) Prior Publication Data

US 2010/0147953 A1 Jun. 17, 2010

(51) Int. Cl.
*G06K 7/10* (2006.01)

(52) U.S. Cl. .......... 235/462.41; 235/462.32; 235/462.37

(58) Field of Classification Search ............. 235/462.32, 235/462.37, 462.38, 462.41
See application file for complete search history.

(56) References Cited

U.S. PATENT DOCUMENTS 4,613,895 A 9/1986 Burkey et al.
4,794,239 A 12/1988 Allais
5,059,779 A 10/1991 Krichever et al.
5,124,539 A 6/1992 Krichever et al.
5,200,599 A 4/1993 Krichever et al.
5,304,786 A 4/1994 Pavlidis et al.
5,559,562 A 9/1996 Ferster
5,703,349 A 12/1997 Meyerson et al.
5,717,195 A 2/1998 Feng et al.
6,141,062 A 10/2000 Hall et al.
6,899,272 B2 * 5/2005 Krichever et al. ....... 235/462.37
6,924,807 B2 8/2005 Ebihara et al.
6,991,169 B2 * 1/2006 Bobba et al. ............. 235/462.39
7,076,097 B2 7/2006 Kondo et al.
7,116,353 B2 10/2006 Hobson et al.
7,191,947 B2 3/2007 Kahn et al.
7,219,831 B2 * 5/2007 Murata ........................ 235/379
7,280,124 B2 10/2007 Laufer et al.
7,430,682 B2 9/2008 Carlson et al.
7,543,747 B2 * 6/2009 Ehrhart ........................ 235/454
7,619,527 B2 * 11/2009 Friend et al. .............. 340/572.3
2003/0029915 A1 2/2003 Barkan et al.
2003/0213841 A1 * 11/2003 Josephson et al. ............ 235/379
2004/0146211 A1 7/2004 Knapp et al.
2005/0098633 A1 5/2005 Poloniewicz et al.
2005/0259746 A1 11/2005 Shinde et al.
2006/0022051 A1 2/2006 Patel et al.
2006/0043193 A1 3/2006 Brock
2007/0079029 A1 4/2007 Carlson et al.
2008/0296382 A1 12/2008 Connell, II et al.

FOREIGN PATENT DOCUMENTS

EP 1006475 6/2000
WO 0182214 11/2001

OTHER PUBLICATIONS

International Search Report and Written Opinion dated Mar. 26, 2010 in related case PCT/US2009/067816.

* cited by examiner

*Primary Examiner* — Ahshik Kim
(74) *Attorney, Agent, or Firm* — Nong-Qiang Fan

(57) ABSTRACT

The present disclosure concerns a bar code reader 10 that can both interpret bar codes and image documents. The bar code reader includes a housing including a vertical and a horizontal transparent window H, V and defining a housing interior region. As a target object is swiped or presented in relation to the transparent windows an image of the target object is captured. Cameras C1-C6 have image capture sensor arrays positioned within the housing interior region for capturing an image of an object within a camera field of view. Two specific cameras can capture the front and back images from a document such as a check 100 placed on the horizontal transparent window.

23 Claims, 7 Drawing Sheets

M5A
M4B
M4C
M4A
C6
C5
22
C4
RIGHT SIDE
LEFT SIDE

IMAGING OF NON-BARCODED DOCUMENTS

FIELD OF THE INVENTION

The present invention relates to an imaging-based bar code reader for imaging non-barcoded objects such as documents.

BACKGROUND OF THE INVENTION

A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents or swipes each target object's bar code with respect to the vertically oriented window or the horizontally oriented window, whichever is more convenient given the specific size and shape of the target object and the position of the bar code on the target object.

U.S. Pat. No. 5,717,195 to Feng et al concerns an "Imaging Based Slot Dataform Reader" having a mirror, camera assembly with photosensor array and illumination system. The disclosure of this patent is incorporated herein by reference.

Retailers that use bar code readers often accept payment from consumers in the form of credit and debit cards, cash and personal checks. A recent government sponsored initiave, known as Check 21 makes it possible for retailers who accept checks to capture images of both sides of the check, and to use that image to process the check, eliminating the need to handle the paper check, and speeding up transactions. Presently, retailers employ a dedicated image scanner that is installed at the point of sale station to scan the checks that have been tendered by consumers. The store employee feeds the check into the scanner, which scans both sides of the check, and ejects the check, whereupon it is returned to the consumer since the store no longer needs the paper check.

A dedicated check scanner must be installed in a place where it doesn't impede the normal barcode scanning process. It must also be wired into the store POS computer system. The check scanner and the associated installation add cost to the overall point of sale (POS) installation, and since most of these scanners include mechanical mechanisms to feed the check through the scanning device, they can jam causing checks to be destroyed, possibly before the image has been captured, or they can experience other forms of mechanical failure causing customer dissatisfaction and requiring a service call. Retailers will often buy service contracts for these scanners to assure that they will be serviced promptly.

SUMMARY OF THE INVENTION

This invention eliminates the need for a dedicated check scanner, along with the need to install the scanner and the need for a service contract for the scanner and the possibility of the check acceptance process being out of service while waiting for a failed scanner to be repaired. The need to clutter point of sales space with the scanner is also eliminated, allowing retailers to use that space for income generating activities.

A bar code reader is disclosed that images both objects that have bar codes and documents not having a bar code. In a document imaging mode, the reader images the front and rear surfaces of the document and saves the images. The exemplary bar code reader includes a housing having a housing interior. The housing includes a transparent window which defines a reader field of view sized to image a document or a bar code containing object that is swiped or presented within the reader field of view.

One exemplary system includes first and second camera systems that have an associated image capture sensor for capturing images within the reader field of view near the transparent window. One camera system captures images of a front of a document within the reader field of view and a second camera system captures images from a back of said document within the reader field of view. An image processing system has a processor that can decode a bar code carried by a target object. In the absence of a bar code, the image processing system stores images of the front and back of the document.

These and other objects, advantages, and features of the exemplary embodiment of the invention are described in detail in conjunction with the accompanying drawings.

DETAILED DESCRIPTION

Figure 1:
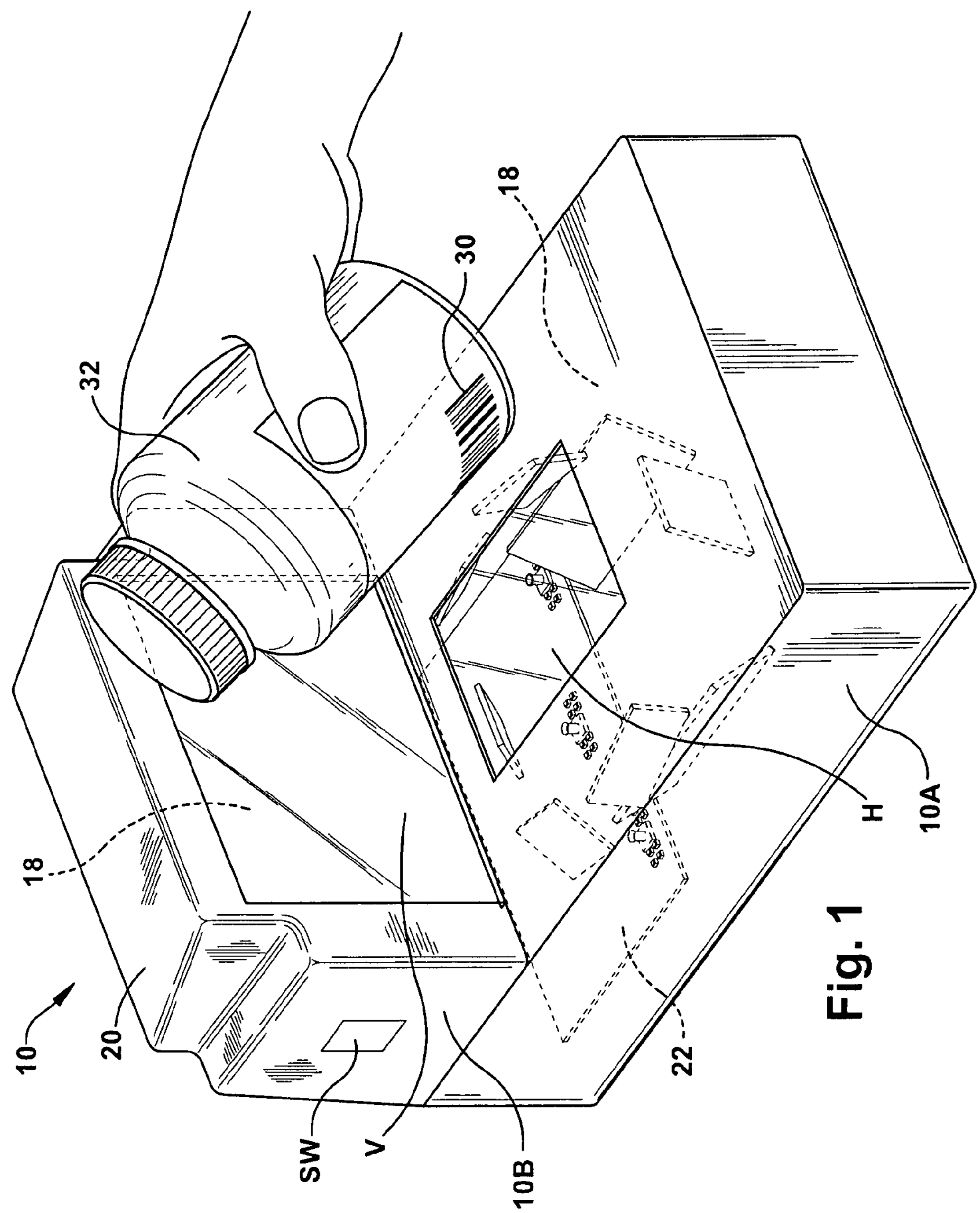
FIG. 1 is a perspective view of a bar code reader having a vertical and a horizontal window through which bar codes are viewed by multiple cameras within the reader constructed in accordance with one example embodiment of the present disclosure.

FIG. 1 depicts a stationary bar code reader 10 having an image and decoder system supported within an interior region 18 of a housing 20. The housing 20 may be integrated into a sales counter of a point of sales system that includes, for example, a cash register, a touch screen visual display or other type user interface and a printer for generating sales receipts. The housing 20 depicted in FIG. 1 includes two transparent windows H, V so that objects moved or positioned outside the housing can be imaged. The housing 10 shown in FIG. 1 has a boxlike base portion 10A which supports the horizontal window and an upright portion 10B which supports the vertical window V. The base and upright portions are attached to form a generally L shaped housing as seen from a side of the housing.

In the exemplary embodiment, multiple cameras C1-C6 are mounted to a printed circuit board 22 located inside the housing at a rear of the base portion 10A. Each camera defines a field-of-view FV1, FV2, FV3, FV4, FV5, FV6. Positioned behind and adjacent to the windows H, V are reflective mirrors that define a given camera field-of-view such that the respective fields-of-view FV1-FV6 pass from the housing 20 through the windows to create an effective total field-of-view (TFV) for the reader 10 in a region of the windows H, V, outside the housing 20. Because each camera C1-C6 has an effective working range WR (shown schematically in FIG. 5) over which a target bar code 30 may be successfully imaged and decoded, there is an effective target area in front of the windows H, V within which an object 32 having a target bar code 30 can be presented or swiped for imaging and decoding.

Figure 4:
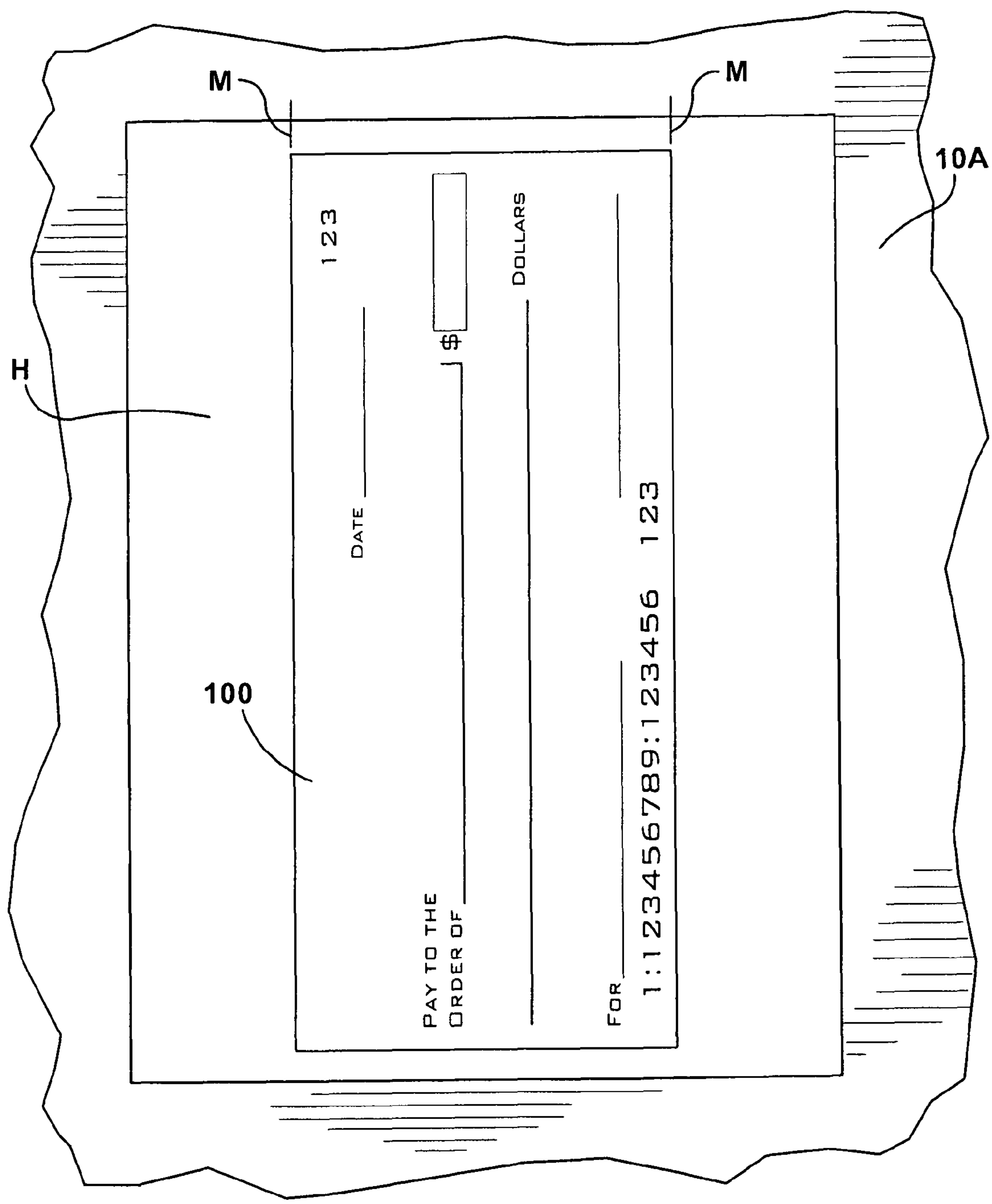
FIG. 4 is a plan view of a horizontal transparent window of an exemplary bar code reader.

In accordance with one use, either a sales person or a customer will present or swipe a product or target object 32 selected for purchase in front of the windows. For one class of items, a target bar code 30 imprinted or affixed to the target object 32 will be presented in or swiped through a region near the windows H, V for reading, that is, imaging and decoding of the coded indicia of the target bar code. For documents such as a check 100 presented within a reader field of view (FIG. 4), the reader 10 captures front and back images of the document.

Imaging Optics

In a bar code decode mode, each camera assembly C1-C6 of the imaging system 12 captures a series of image frames of its respective field-of-view FV1-FV6. The series of image frames for each camera assembly C1-C6 is shown schematically as IF1, IF2, IF3, IF4, IF5, IF6 in FIG. 5. Each series of image frames IF1-IF6 comprises a sequence of individual image frames generated by the respective cameras C1-C6. As seen in the drawings, the designation IF1, for example, represents multiple successive images obtained from the camera C1. As is conventional with imaging cameras, the image frames IF1-IF6 are in the form of respective digital signals representative of raw gray scale values generated by each camera assembly C1-C6.

Digital signals 35 that make up the frames are coupled to a bus interface 42, where the signals are multiplexed by a multiplexer 43 and then communicated to a memory 44 in an organized fashion so that the processor knows which image representation belong to a given camera.

The image processors 15 access the image frames IF1-IF6 from memory 44 and search for image frames that include an imaged target bar code 30'. If the imaged target bar code 30' is present and decodable in one or more image frames, the decoder 16 attempts to decode the imaged target bar code 30' using one or more of the image frames having the imaged target bar code 30' or a portion thereof. If no bar code is present, the image processors look for documents within the image.

Each camera includes a charged coupled device (CCD), a complementary metal oxide semiconductor (CMOS), or other imaging pixel array, operating under the control of the imaging processing system 14. In one exemplary embodiment, the sensor array comprises a two-dimensional (2D) CMOS array with a typical size of the pixel array being on the order of 752×480 pixels. The illumination-receiving pixels of the sensor array define a sensor array surface secured to a printed circuit board for stability. The sensor array surface is substantially perpendicular to an optical axis of an imaging lens assembly, that is, a z axis that is perpendicular to the sensor array surface would be substantially parallel to the optical axis of a focusing lens. The pixels of the sensor array surface are disposed in an orthogonal arrangement of rows and columns of pixels.

The reader circuitry 11 includes imaging system 12, the memory 44 and a power supply 11*a*. The power supply 11*a* is electrically coupled to and provides power to the circuitry 11 of the reader. Optionally, the reader 10 may include an illumination system 60 (shown schematically in FIG. 5) which provides illumination to illuminate the effective total field-of-view to facilitate obtaining an image 30' of a target bar code 30 that has sufficient resolution and clarity for decoding. An exemplary system has light emitting diodes closely spaced from an associated charge coupled device for each of the cameras C1-C6. These LEDs are selectively activated to emit light under control of the processors 15.

Decoding Images

Figure 5:
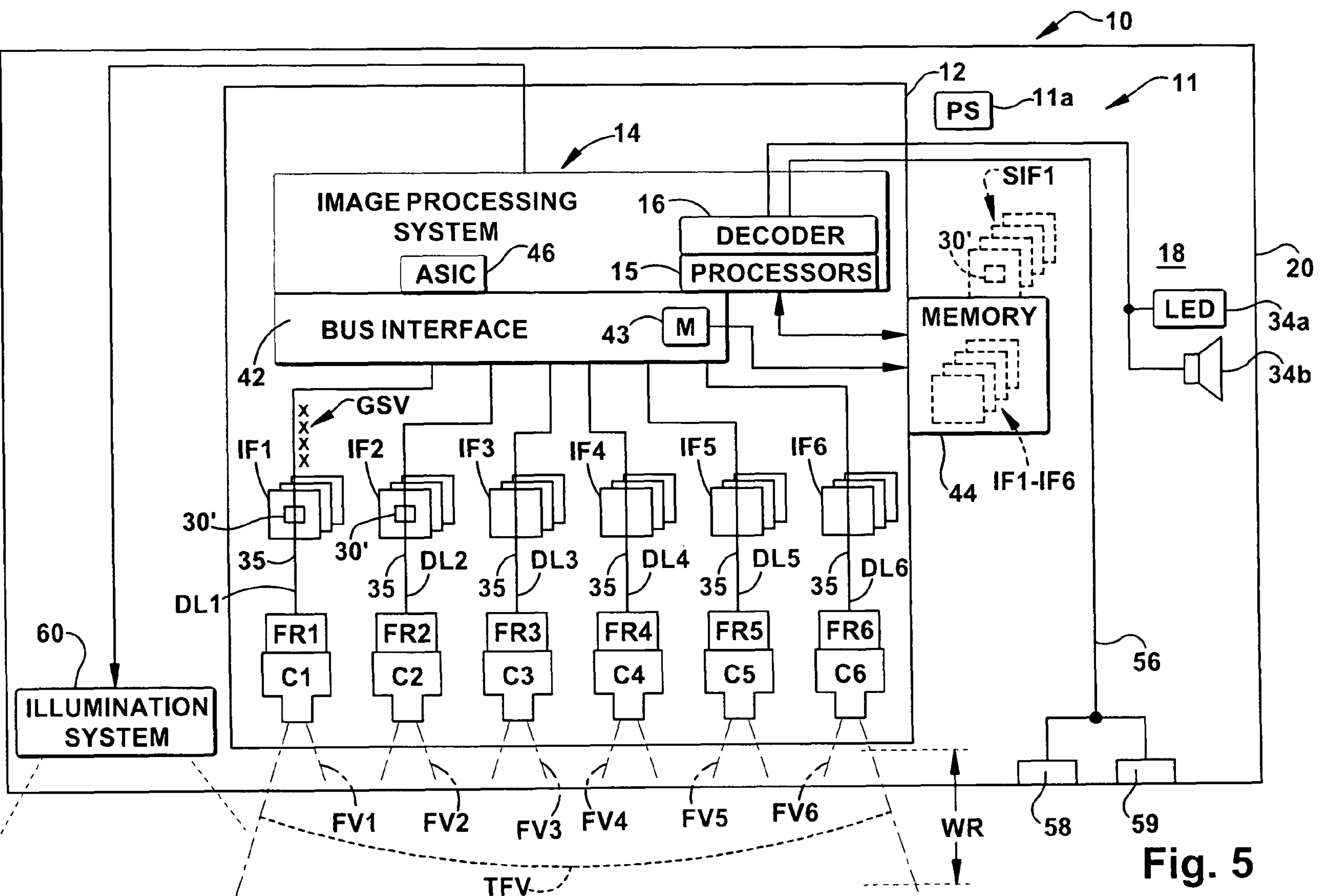
FIG. 5 is a schematic block diagram of selected systems and electrical circuitry of the bar code reader of FIG. 1.

As is best seen in FIG. 5, the digital signals 35 are received by the bus interface 42 of the image processing system 40, which may include the multiplexer 43, operating under the control of an application specific integrated circuit (ASIC) 46, to serialize the image data contained in the digital signals 35. The digitized values of the digitized signal 35 are stored in the memory 44. The digital values GSV constitute a digitized version of the series of image frames IF1-IF6, which for each camera assembly C1-C6 and for each image frame is representative of the image projected by the imaging lens assembly onto the pixel array during an exposure period. If the field-of-view of the imaging lens assembly includes the target bar code 30, then a digital image 30' of the target bar code 30 is obtained.

The decoding circuitry 14 operates in one or two modes controlled by a switch SW on the housing. When in a bar code decode mode, the reader 10 captures a series of images from the six camera assemblies and then retrieving an image from memory and determines if the image has a bar code. If so the processor 15 attempts to decode any decodable image within the image frame, e.g., the imaged target bar code 30'. If the decoding is successful, decoded data 56, representative of the data/information coded in the target bar code 30 is then output 126 via a data output port 58 and/or displayed to a user of the reader 10 via a display output 59. Upon achieving a good read of the target bar code 30, that is, the bar code 30 was successfully imaged and decoded, a speaker 34*b* and/or an indicator LED 34*a* is activated by the bar code reader circuitry 11 to indicate to the user that the target bar code 30 has been successfully read.

In document capture mode, the user will place a document to be imaged on the horizontal window H of the reader 10 and then actuates the switch SW to initiate document capture by the processor or processors 15. By pressing a button switch SW on the reader of on a cash register (not shown) front and back document images are captured and stored until the check-cashing system to which the reader is connected, is ready to receive the image.

The user places a check 100 onto the horizontal window with its long dimension aligned with the long dimension of the reader field of view. A typical check length is nearly as long as the long dimensions of the window H and marks M help the user properly align the check. Imaging the document after the user has placed it on the window and pressed the switch SW helps assure that the check is static and properly positioned within the field of view of the imagers when the image is captured, so only a single, high quality image will be transmitted to a host computer.

In some embodiments, the reader 10 may have an ability to read the MICR characters on the check using Optical Character Recognition (OCR). Optical character recognition is well known in the imaging art. The reader can perform other image processing functions. For example, the reader can compare a signature to a signature in a database (typically stored in a remote computer). In other cases it may simply transmit the image to another computer.

If a document is present, the processor has already stored the front and back images of that document in memory. These image may be stored within the reader for batch transfer or may be immediately transmitted to a point of sale computer by means of the data output 58.

Figure 6:
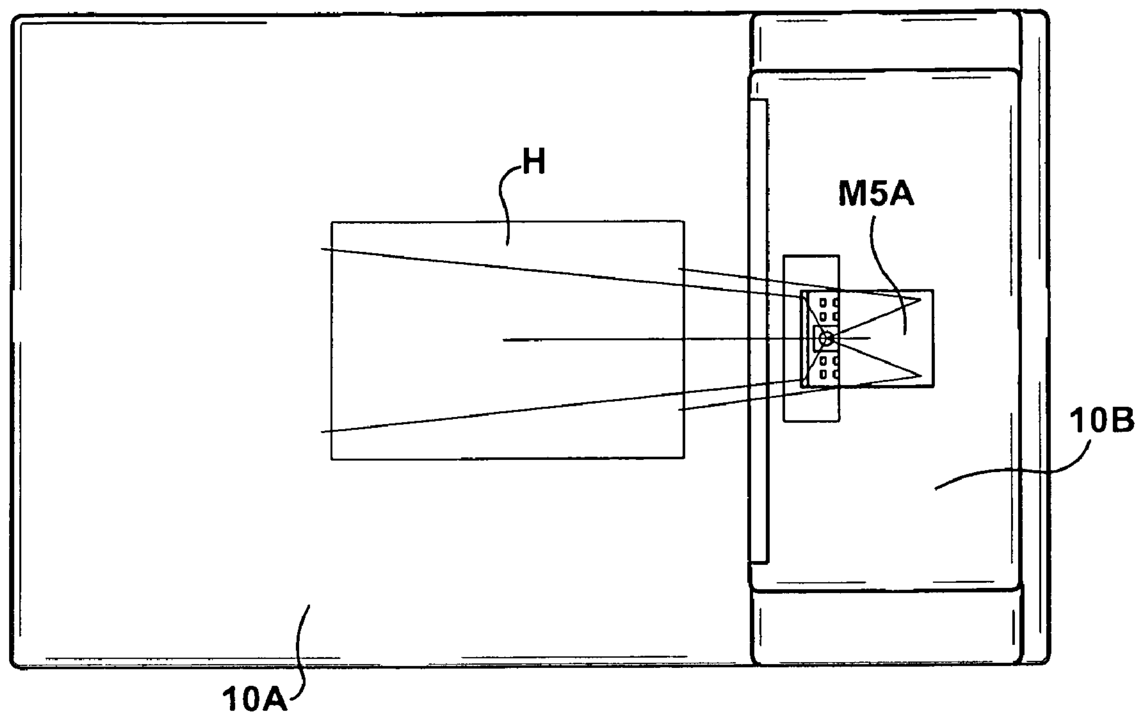
FIG. 6 is a top plan view of the FIG. 1 exemplary bar code reader showing a portion of the reader field of view for viewing a top surface of a document that has been placed on a horizontal window.
Figure 7:
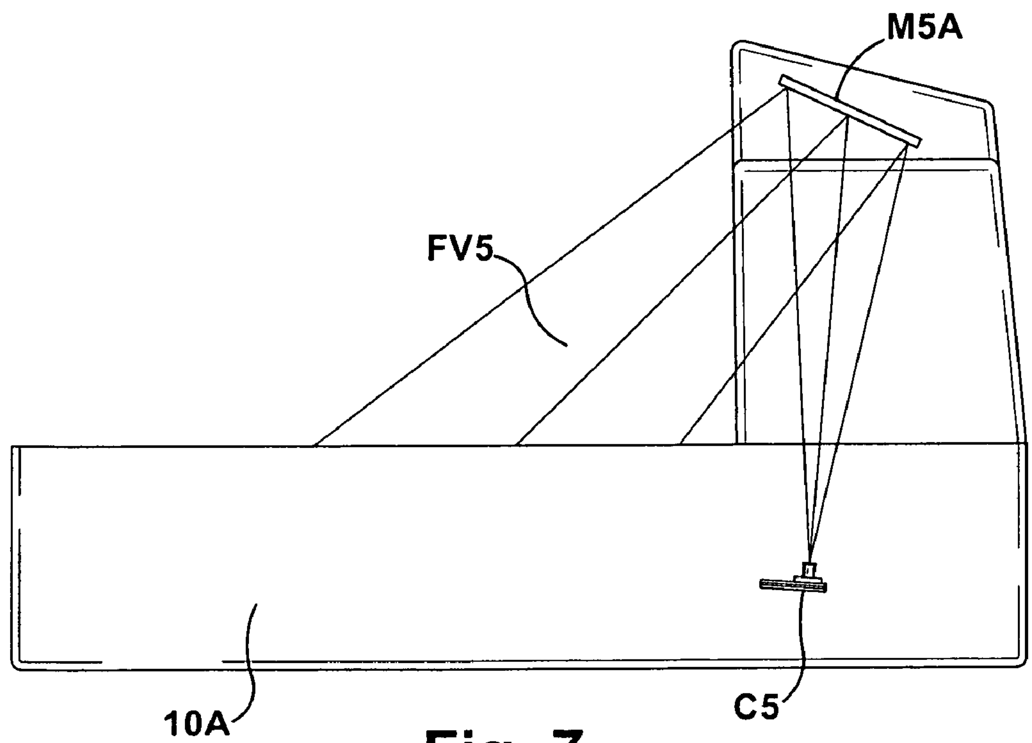
FIG. 7 is a side elevation view of the FIG. 1 bar code reader illustrating a field of view for viewing a top surface of a document on a horizontal window.
Figure 8:
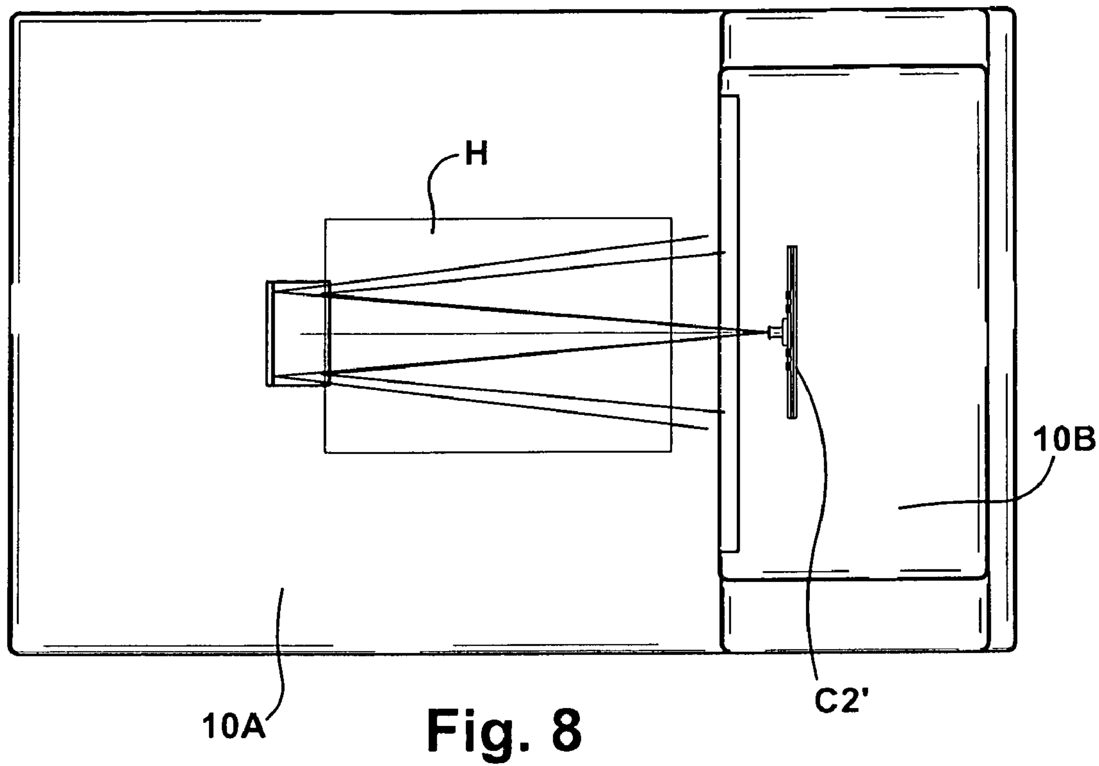
FIG. 8 is a top plan view of the FIG. 1 exemplary bar code reader showing a portion of the reader field of view for viewing a bottom surface of a document placed on a horizontal window.
Figure 9:
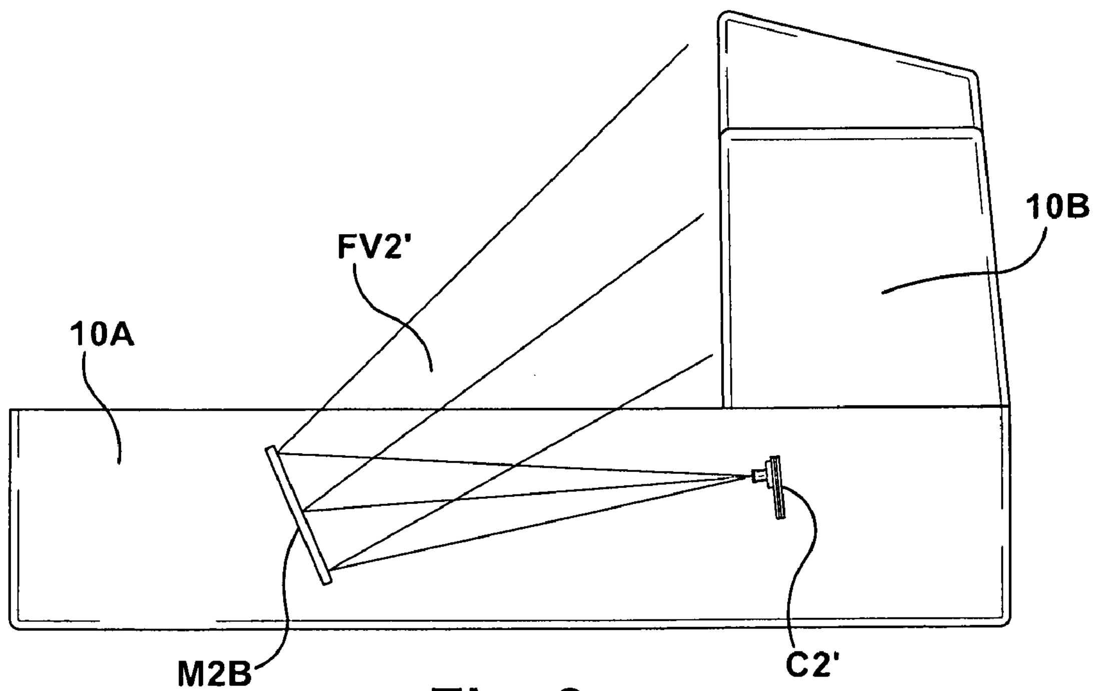
FIG. 9 is a side elevation view of the FIG. 1 bar code reader illustrating a field of view for viewing a bottom surface of a document on a horizontal window.

FIGS. 8 and 9 show an imaging camera assembly C2' that captures images from objects from an angle from below the horizontal window H of the reader 10. This allows the sensor array of the camera assembly C2' to see whatever is on the bottom of anything that rests on or is passed over the horizontal window. The imager field of view FV2' is reflected off a mirror MB2 to allow the optical system to fit in a housing that is not too deep for installation in a POS station. FIGS. 6 and 7 show another imaging camera assembly C5 looking downwards at the upper surface of the horizontal window H after reflecting off a mirror M5A. These two camera assemblies are positioned to enable scanning barcodes on the top and bottom of packages that are moved over the horizontal window. They also capturing images of a document, such as a check 100 (FIG. 4), that is placed on the window H. The two camera assemblies working together can capture images of both sides of a check that is placed on the window H, as required by Check 21.

An optical axis of these two camera assemblies is slanted with respect to the window, so any images that they might capture will show a slanted document, as opposed to s straight-on view as would be desirable. The angles at which the two imagers are positioned with respect to the window are known, however, so the images can be de-tilted by processing of the images after they are captured. The reader 10 then transmits undistorted images to the check processing system, just as the existing dedicated check scanners do.

The imagers used in a scanner like this for barcode reading can perform adequately with sensor arrays as small as around 752×480 pixels. This is known as a wide VGA sensor. This kind of sensor has the advantage of relatively high frame rates (60 frames per second), which facilitates the scanning of fast-moving barcodes. The relatively small array size also minimizes how much data must be processed to read a barcode, allowing for faster response from the barcode scanner and/or minimizing the cost of the image processing system. This relatively low resolution sensor, however, may not provide adequate resolution for a clear image of a check.

To improve image capture functionality, the cameras C2', C5 are higher resolution sensors such as sensors with 1.2 to 1.3 megapixels. When barcodes are being scanned, these two cameras will also be used to perform that function. The increased resolution can be used to improve performance on barcodes with very narrow bars or spaces. Alternatively, with some sensors it is possible to use a reduced resolution mode of image capture in which data from a subset of the pixels are read-out and processed. This low resolution mode has the advantage in this application of reducing image processing requirements and allowing higher frame rates. For example, a 1.3 megapixel sensor can operate at a frame rate of 30 frames/second at full resolution or at 60 frames/second at reduced resolution. A scanner that uses such a sensor can therefore operate the cameras at reduced resolution when reading barcodes that may be moving rapidly, or at full resolution to capture images of checks that are stationary on the window.

Switching between these two modes can also be controlled by a host POS system or controller, which can signal via the input port 59 to the bar code reader 10 when to be in barcode reading mode and when to operate in document image capture mode. It may be desirable to alter the level of illumination supplied by the illumination system (made up of one or more LED per image system) in the scanner housing, depending on which mode is activated. The fields of view of cameras that capture the front and back sides of a document may not entirely cover the horizontal window. Markings M near the periphery of the window, or on the window itself indicate where the document 100 should be placed. The windows on barcode readers used in supermarkets and the like often become dirty or scuffed. This can interfere with the quality of the captured image. This dirt is stationary in every frame so the location of dirt in the image can be stored in the scanners memory allowing it to be subtracted from the image of the captured document. Alternatively, the scanner can recognize when dirt has accumulated and signal the operator to clean the window before capturing the image of a document.

Exemplary Multi-Camera Bar Code Reader

Figure 2:
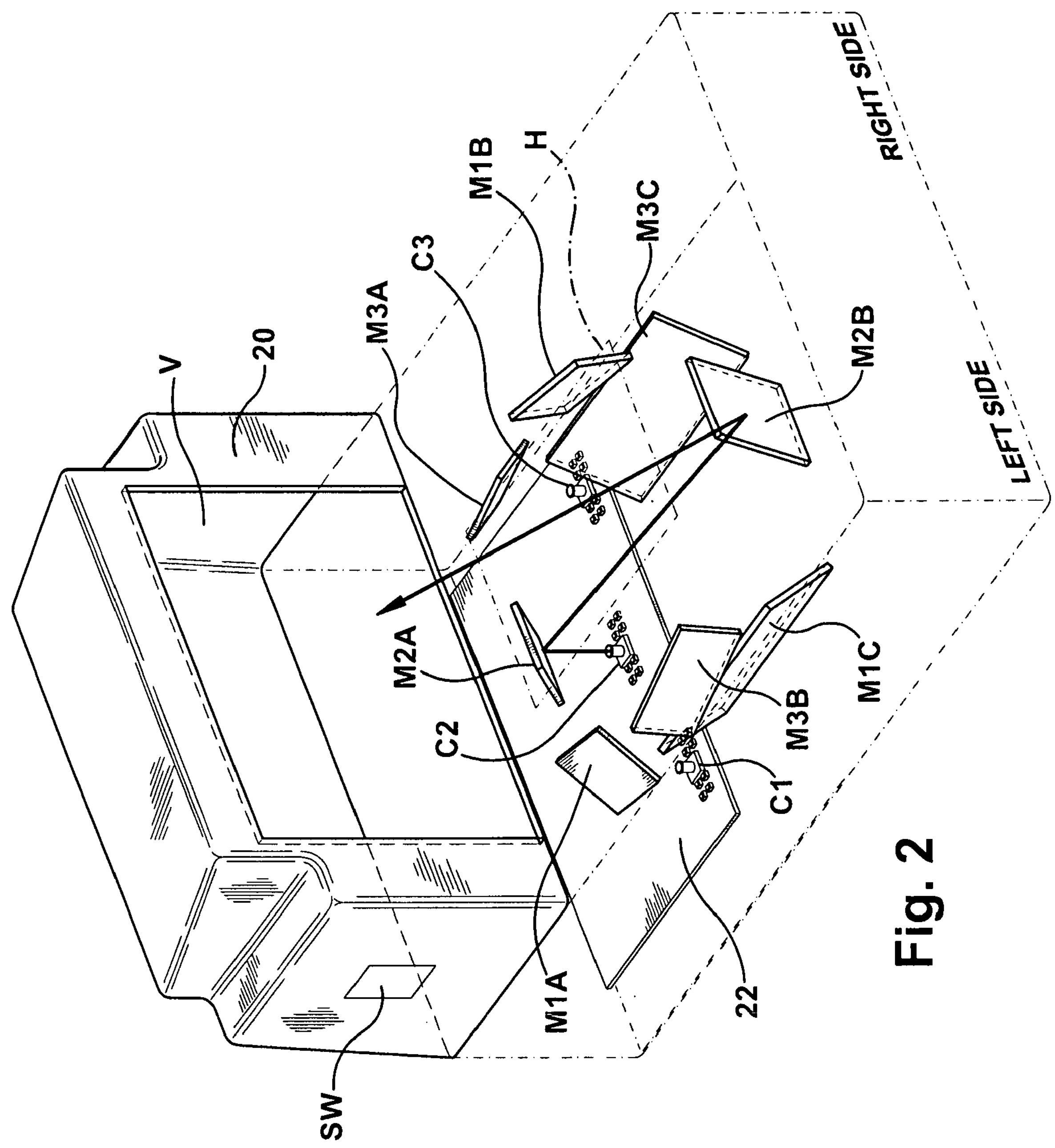
FIG. 2 is a perspective view of the reader of FIG. 1 with a portion of the reader housing removed to illustrate a plurality of cameras located on a printed circuit board.
Figure 3:
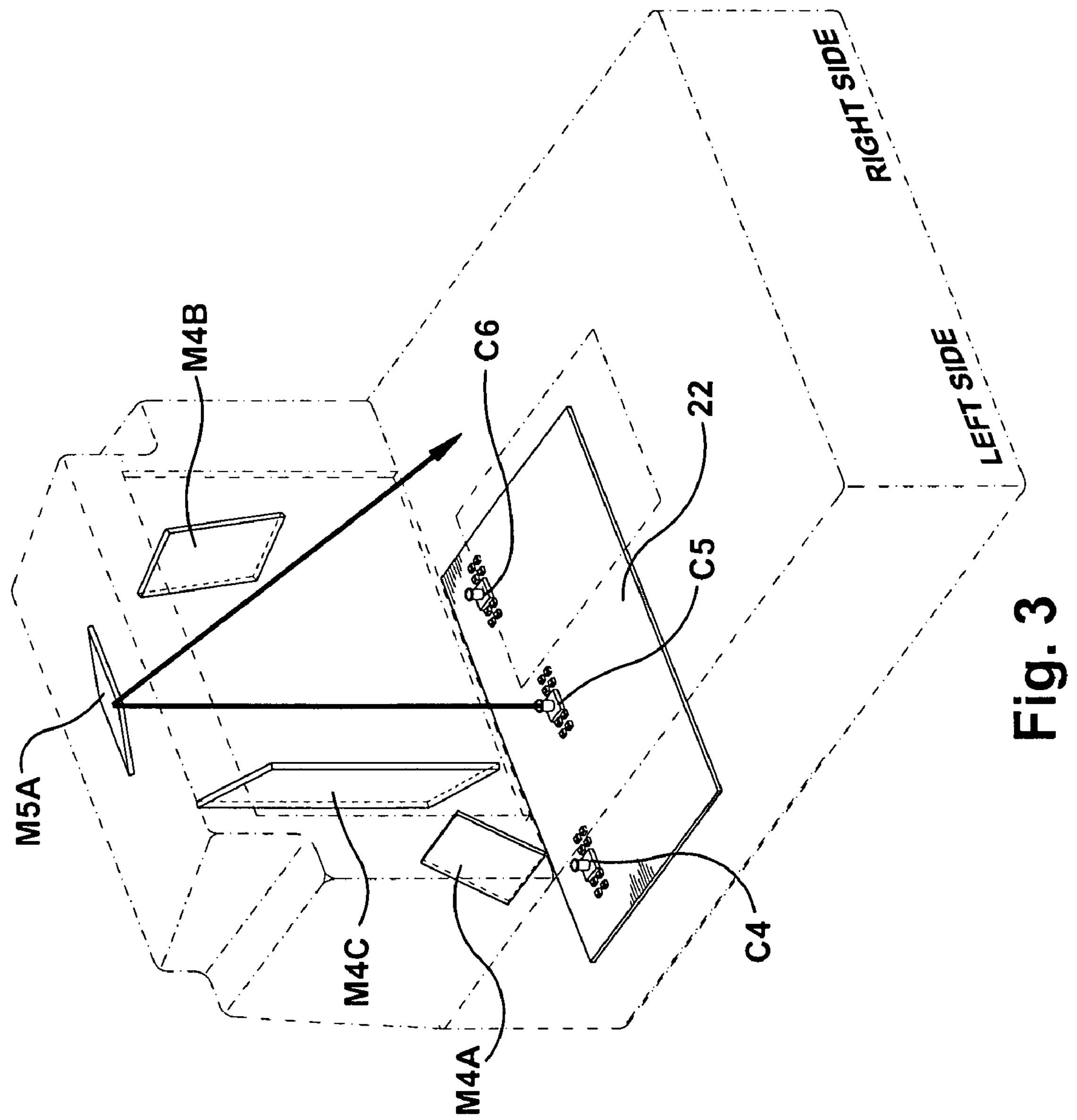
FIG. 3 is a perspective view of the reader of FIG. 1 showing additional cameras located on the printed circuit board shown in FIG. 2.

FIGS. 2 and 3 depict an exemplary dual window bar code reader having a printed circuit board 22 that supports six imaging cameras assemblies. Additional details of this bar code reader are contained in pending U.S. patent application Ser. No. 12/266,642 having a filing date of Nov. 7, 2008 and which is incorporated herein by reference.

Three camera assemblies have a field-of-view extending from a generally horizontal window H are shown, namely C1, C2, and C3. Camera or imager C1 and its associated optics faces generally vertically upward toward an inclined folding mirror MIA substantially directly overhead at a left side of the horizontal window H. The folding mirror M1A faces another inclined narrow folding mirror M1B located at a right side of the horizontal window H. The folding mirror M1B faces still another inclined wide folding mirror M1C adjacent the mirror M1A. The folding mirror M1C faces out through the generally horizontal window H toward the right side of the dual window scanner such to form an imaging field-of-view.

The camera or imager C3 and its associated optics are symmetrical with respect to a center line of the reader to imager C1. Camera C3 faces generally vertically upward toward an incline folding mirror M3A substantially directly overhead at a right side of the horizontal window H. The folding mirror M3A faces another inclined narrow folding mirror M3B located at a left side of the horizontal window H. The folding mirror M3B faces still another inclined wide folding mirror M3C adjacent the mirror M3A. The folding mirror M3C faces out through the generally horizontal window H toward the left side of the dual window reader.

Imager or camera C2 and its associated optics are located between imagers C1 and C3 and their associated optics. Imager C2 faces generally vertically upward toward an inclined folding mirror M2A substantially directly overhead generally centrally of the horizontal window H at one end thereof. The folding mirror M2A faces another inclined folding mirror M2B located at the opposite end of the horizontal window H. The folding mirror M2B faces out through the window H in an upward direction toward the vertical window V in the housing 20 and as such can image a bottom side of a document such as the check 100 resting on the window H.

As illustrated in FIG. 3, the dual window reader has a camera or imager C4 and its associated optics faces generally vertically upward toward an incline folding mirror M4A substantially directly overhead at a left side of the vertical window V. The folding mirror M4A faces another inclined narrow folding mirror M4B located at a right side of the vertical window V. The folding mirror M4B faces still another inclined wide folding mirror M4C adjacent the mirror M4A. The folding mirror M4C faces out through the generally vertical window V toward the right side of the dual window reader.

In FIG. 3 camera or imager C6 and its associated mirrors are symmetrical to imager C4 about a line extending through the center of the base portion 10A of the reader housing 10. The fold mirrors that define the field of view for this camera assembly C6 are deleted from this Figure for clarity.

In FIG. 3, imager or camera C5 and its associated optics are located generally centrally between imagers C4 and C6 and their associated optics. Imager C5 faces generally vertically upward toward an inclined folding mirror M5A substantially directly overhead generally centrally of the vertical window V at one end thereof. The folding mirror M5A faces out through the window V in a downward direction toward the horizontal window H in the housing 20 and captures images of a top surface of a document such as the check 100 resting on the top surface of the horizontal window H.

Features and functions of the fold mirrors shown in the figures are described in further detail in U.S. patent application Ser. No. 12/245,111 to Drzymala et al filed Oct. 3, 2008 which is incorporated herein by reference. When a mirror is used in an optical layout to reflect the reader field of view to another direction, the mirror may be thought of as an aperture (an aperture is a defined as a hole or an opening through which light is admitted). The depictions in the copending application show optical layouts which represent one or more fold mirrors that achieve long path lengths within the reader housing. When the mirror clips or defines the imaging or camera field of view it is referred to as vignetting. When the mirror clips extraneous or unneeded light from a source such as a light emitting diode, it is commonly referred to as baffling. In the Figures three fold mirrors are used to define a given field of view. Other numbers of mirrors, however, could be used to direct light to a field of view outside the housing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed:

1. A bar code reader for both reading bar codes and imaging a document not having a bar code affixed thereto, the bar code reader comprising:

a housing having a housing interior and including a horizontal transparent window and a vertical transparent window that define a reader field of view for imaging a document or a bar code containing object that is swiped or presented within the reader field of view;

a camera system having one or more image capture sensors for capturing images within the reader field of view near the horizontal transparent window and the vertical transparent window wherein the field of view includes a front of a document within the reader field of view and a back of said document within the reader field of view; and an image processing system comprising a processor for decoding a bar code carried by the target object or, storing images of the front and back of a document.

2. The bar code reader of claim 1 wherein the housing is stationary.

3. The bar code reader of claim 1 comprising a control for switching between a bar code containing object capture mode and a document image capture mode.

4. The bar code reader of claim 3 wherein the control is a user actuated switch.

5. The bar code reader of claim 3 wherein the control is a point of sale controller coupled to said bar code reader for back and forth communication between the point of sale controller and the bar code reader.

6. The bar code reader of claim 1 comprising first and second camera systems wherein each camera system has an associated image capture sensor and where one camera system captures images of a front of a document within the reader field of view and a second camera system captures images from a back of said document within the reader field of view.

7. The bar code reader of claim 6 wherein the bar code reader is a stationary bar code reader having a generally vertical and a generally horizontal transparent window and wherein one camera system images a bottom surface of a document through the horizontal window and a second camera system images a top surface of a document through the vertical window.

8. The bar code reader of claim 1 wherein the image processing system performs optical character recognition on documents whose front and back sides are imaged to search for identifiable characters on the documents.

9. The bar code reader of claim 1 wherein the image processing system compares a signature on the document with a stored image of a signature to confirm the signature.

10. A bar code reader for both reading bar codes and imaging a document not having a bar code affixed thereto, the bar code reader comprising:

a housing having base portion and an upright portion enclosing a housing interior and including a generally horizontal and a generally vertical transparent window which define a reader field of view for imaging a document or a bar code containing object that is swiped or presented within the reader field of view;

first and second camera systems wherein each camera system has an associated image capture sensor for capturing images within the reader field of view near the vertical and horizontal transparent windows wherein a first camera system captures images of a front of a document resting on the horizontal window within the reader field of view and a second camera system captures images from a back of said document resting on the horizontal window within the reader field of view; and an image processing system comprising a processor for decoding a bar code carried by the target object or, storing images of the front and back of a document.

11. The bar code reader of claim 10 wherein the first and second camera systems are positioned within the housing at a rear portion of the base and additionally comprising a mirror within the upright portion for directing light from a top of a document resting on the horizontal window through the vertical window and to the first camera system and further comprising a second mirror located within a front portion of the base for directing light from a back of a document resting on the horizontal window through said housing interior to said second camera system.

12. A method for imaging a target bar code or document with a bar code reader comprising:

providing a bar code reader housing having two transparent windows that define a reader field of view for movement and/or positioning of an object having a bar code;

positioning one or more cameras having associated sensor arrays within the housing for imaging bar codes on objects outside the housing;

capturing images as light from said reader field of view impinges onto the sensor arrays of said one or more cameras; and interpreting images captured from the reader field of view to decode a bar code or storing images from a front and back of a document within the reader field of view.

13. The method of claim 12 wherein two cameras are positioned in the bar code reader housing and wherein one camera views a front of a document and a second camera views a back of the document.

14. The method of claim 13 wherein one window is generally horizontal and a document for imaging is placed on the horizontal window for document imaging.

15. The method of claim 13 wherein images of a front and back of a document are stored on a memory external to the bar code reader.

16. The method of claim 12 wherein the images of a front and back of a document are stored in response to a user actuated control.

17. The method of claim 12 wherein the images of a front or back of a document are stored in response to a signal from a remotely located controller.

18. The method of claim 13 wherein the bar code reader housing includes a base portion supporting a horizontal transparent window and an upright portion supporting a vertical transparent window and wherein one camera has a camera field of view that includes a top of the transparent horizontal window and captures images of a top surface of a document resting on the horizontal transparent window and a second camera has a camera field of view that includes a bottom of the horizontal transparent window and captures images from a bottom surface of a document resting on the horizontal transparent window.

19. The method of claim 18 wherein each of the camera fields of view are defined in part by positioning deflecting mirrors between the first and second cameras and the horizontal window.

20. The method of claim 18 comprising positioning a deflecting mirror in the upright portion of the housing and deflecting light passing through the vertical window from a document to said one camera to capture images of a top surface of documents placed on the horizontal window.

21. The method of claim 12 wherein a stored image of the document is searched for characters using an optical character recognition process and if characters are found transmitting said characters to an external storage.

22. The method of claim 12 wherein a stored image of a signature is compared with a signature within an image of the document to verify the signature on said document.

23. An imaging-based bar code reader for imaging a target bar code on a target object, the bar code reader comprising:

a housing supporting a horizontal window and a vertical window and defining an interior region, a target object being presented to or swiped through the housing for imaging a target bar code;

an imaging system comprising camera means having an image capture sensor means positioned within the housing interior region for capturing an image of a bar code within a bar code reader field of view as well as the front and back surfaces of a document resting on the horizontal window; and light reflecting means for defining multiple camera fields of view that combine to form a reader field of view including mirrors positioned with respect to said sensor means for deflecting light along a light path from the reader field of view that bounces from a target in the field of view along said light path to the image capture sensor means; and image processing means for selectively activating the light source means and identifying a bar code or saving images of a front and back side of a document within the reader field of view from images captured by the imaging system.

* * * * *